(12) United States Patent
Isono

(10) Patent No.: US 6,297,976 B1
(45) Date of Patent: Oct. 2, 2001

(54) THIN, CASCADE-CONNECTED DIRECT CURRENT SOURCE CIRCUIT

(75) Inventor: Katsuo Isono, Tokyo (JP)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/557,181

(22) Filed: Apr. 21, 2000

(30) Foreign Application Priority Data

Apr. 23, 1999 (JP) ................................................ 11-116656

(51) Int. Cl.[7] .................................................. H02M 3/335
(52) U.S. Cl. .................................. 363/65; 363/71; 363/95
(58) Field of Search ................................. 363/65, 71, 78, 363/84, 89, 95; 307/43, 52, 53, 60, 69, 82

(56) References Cited

U.S. PATENT DOCUMENTS

| | | | |
|---|---|---|---|
| 3,515,974 | * | 6/1970 | Stich ....................................... 363/65 |
| 5,202,618 | * | 4/1993 | Nishimura .............................. 323/270 |
| 5,768,117 | * | 6/1998 | Takahashi et al. ...................... 363/65 |
| 5,953,223 | * | 9/1999 | Kato et al. .............................. 363/69 |
| 6,014,322 | * | 1/2000 | Higashi et al. ......................... 363/65 |

\* cited by examiner

*Primary Examiner*—Adolf Deneke Berhane

(57) ABSTRACT

The present invention relates to a power supply having a plurality of converters which is capable of easily setting a load share of each converter and simplifying the construction of the circuit, thereby reducing the cost. A DC source circuit having such a power supply includes a plurality of converters (each having a transformer, switches for interrupting a DC input and supplying the same to a first side of the transformer and a rectifier circuit for rectifying a voltage outputted from a second side of the transformer), an output circuit which cascade-connects each output voltage of the plurality of converters and thereby obtains a composite output voltage $V_{out}$, and a common control circuit for feedback-controlling the plurality of switches as a function of the composite output voltage, e.g., according to the difference between the composite output voltage and the reference voltage. A load of each converter is shared according to each set output voltage. In addition, the cost of the power supply can be reduced by commonly using the control circuit.

11 Claims, 5 Drawing Sheets

THIN, CASCADE-CONNECTED DIRECT CURRENT SOURCE CIRCUIT

BACKGROUND OF THE INVENTION

1. Field of the Invention

The present invention relates to a power supply using a DC/DC converter and, more particularly, to a direct current source circuit in which a load share of each converter is easily set and the construction of the circuit is simplified.

2. Description of the Background Art

For a power supply such as a PDP (plasma display panel) TV, a large scale DC/DC converter is used. Hereinafter, the DC/DC converter is referred to as a converter. Since the above PDP TV is thin generally (about 100 mm), the power supply to be installed at the PDP TV must be thinned.

FIG. 1 is a view showing the construction of a source circuit for a conventional PDP TV. Rectifiers 12 and 13 are connected to rear ends of a plug 11. A standby power source 14 constructed by the converter is connected to a rear end of the rectifier 12 and outputs 5.6V. A power-factor control circuit 15 and a condenser 16 are connected to rear ends of the rectifier 13, and panel power sources 17–19 defining constructed by the converter are connected to rear ends of the power-factor control circuit 15 and the condenser 16.

A $V_s$ power source 17 is used for panel sustaining and generates outputs of −160~−190V, 1.9 A. A $V_D$ power source 18 is used for panel addressing and generates outputs of 50~90V, 1.7 A. $V_{cc}$ power source 19 is used for controlling a logic unit and generates outputs of 5V, 6 A. A signal processing power supply 20 is a power source for use with a TV/panel interface.

FIG. 2 shows the construction of a circuit for a converter constituting power sources 16 though 20, and FIG. 3 shows the waveform of an operation of a converter circuit.

A converter illustrated in FIG. 2 is a conventional current resonance converter. Transistors $Q_1$ and $Q_2$ constituting a main switch are connected to a DC power source $V_{in}$ in serial. Current diodes $D_1$ and $D_2$ are connected respectively to the transistors $Q_1$ and $Q_2$ in parallel. The transistors $Q_1$ and $Q_2$ are turned on and off in turns, with each being provided with control signals $V_{gs1}$ and $V_{gs2}$ by a feedback control circuit non-illustrated.

A smoothing condenser $C_v$, a first side coil NP of a transformer $T_1$ (converter transformer), and a serial circuit of a resonance condenser $C_i$ are connected to the transistor $Q_2$ in parallel. The transformer $T_1$ steps up or down a voltage and separates first and second sides electrically. Since the first side coil $N_p$ of the transformer $T_1$ has a coil structure of loose coupling, inductance components $L_r$ and $L_p$ are formed by a leakage inductance. The inductance components $L_r$ and $L_p$ and the condenser $C_i$ constructs a serial resonance circuit. A second side coil $N_s$ of the transformer $T_2$ and diodes $D_3$ and $D_4$ constructs a rectifier circuit. An output voltage $V_{out}$ is supplied to a load through a smoothing condenser $C_0$.

The operation of the converter in FIG. 2 will be described in brief using a waveform view of FIG. 3.

When the signals $V_{gs1}$ and $V_{gs2}$ are supplied to the transistors $Q_1$ and $Q_2$ by the non-illustrated control circuit, the transistors $Q_1$ and $Q_2$ are turned on/off in turn. In addition there are dead time periods $t_3$~$t_4$ and $t_7$~$t_8$ during which both transistors $Q_1$ and $Q_2$ are turned off at the same time. In FIG. 3, applied voltages of the transistors $Q_1$ and $Q_2$ are represented as square waves $V_{ds1}$ and $V_{ds2}$, and currents thereof are represented as $I_{d1}$ and $I_{d2}$.

When the transistors $Q_1$ and $Q_2$ are turned on/off by turns at a certain particular switching frequency, a square wave voltage $V_{ds2}$ is applied to the serial resonance circuit constructed of the inductance components $L_r$ and $L_p$ and the condenser $C_i$ and a resonance current $I_r$ flows in the serial resonance circuit.

FIG. 4 is a view showing the frequency characteristics of a serial resonance circuit in a converter. In the serial resonance circuit constructed of the inductance components $L_r$ and $L_p$ and the condenser $C_i$, the resonance current varies according to the change of the frequency. By setting the range of frequency control as $f_1$~$f_2$, which are greater than the resonance point $f_0$, the resonance current $I_r$ varies according to the switching frequency of the transistors $Q_1$ and $Q_2$, and it is increased when the frequency is decreased and it is decreased when the frequency is increased.

As illustrated in FIGS. 2 and 3, the resonance condenser $C_i$ is charged and discharged by the resonance current $I_r$ and thus the voltage $V_{ci}$ is changed. In addition, in the dead time periods during which the transistors $Q_1$ and $Q_2$ are turned off at the same time, a current $I_{cv}$ is supplied from the smoothing condenser $C_v$ to the serial resonance circuit. When the currents $I_{d1}$ and $I_{d2}$ flowing in the transistors $Q_1$ and $Q_2$ are controlled as $I_d>0$, current flows in the current diodes $D_1$ and $D_2$ and zero voltage switching or zero current switching is implemented.

In a case where the above-described converter is applied to a PDP TV, the converter constituting a power unit is required to have a limitation on height for the purpose of thinning the PDP TV. To satisfy the above requirement, a large scale converter can be constructed by connecting a plurality of small scale converters with respect to the large scale power source such as the $V_s$ power source 17 of FIG. 1.

As seen from above, one problem is that a load of each converter, that is, current flowing in each converter transformer has to have an uniform amount. Another problem is that a control circuit is required to be installed at each converter, thus increasing the cost.

SUMMARY OF THE INVENTION

Accordingly, it is an object of the present invention to provide a power supply constructed of a plurality of converters in which a load share of each converter is easily set and the construction of the circuit is simplified, thereby reducing the cost.

To achieve the above objects, there is provided a DC source circuit in accordance with the present invention which includes: a plurality of converters each having a transformer, switches for interrupting a DC input and supplying the same to a first side of the transformer and rectifier circuit for rectifying a voltage outputted from a second side of the converter transformer; an output circuit which cascade-connects each output voltage of the plurality of converters and thereby obtains a composite output voltage; and a common control circuit for feedback-controlling the plurality of switches according to the difference between the composite output voltage and the reference voltage.

According to the present invention, since the output of each converter is cascade-connected, each converter has a load share according to its output voltage. In addition, by using a common control circuit for performing a feedback control with respect to a plurality of converters, the construction of the circuit is simplified, thereby reducing the cost.

The converter for use in a power supply in accordance with present invention is a converter of a certain form. For example, a current resonance converter, a voltage resonance converter, a forward converter, a RCC converter, and a flyback converter are used.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The preferred embodiments of the present invention will be described with reference to the accompanying drawings.

Figure 1:
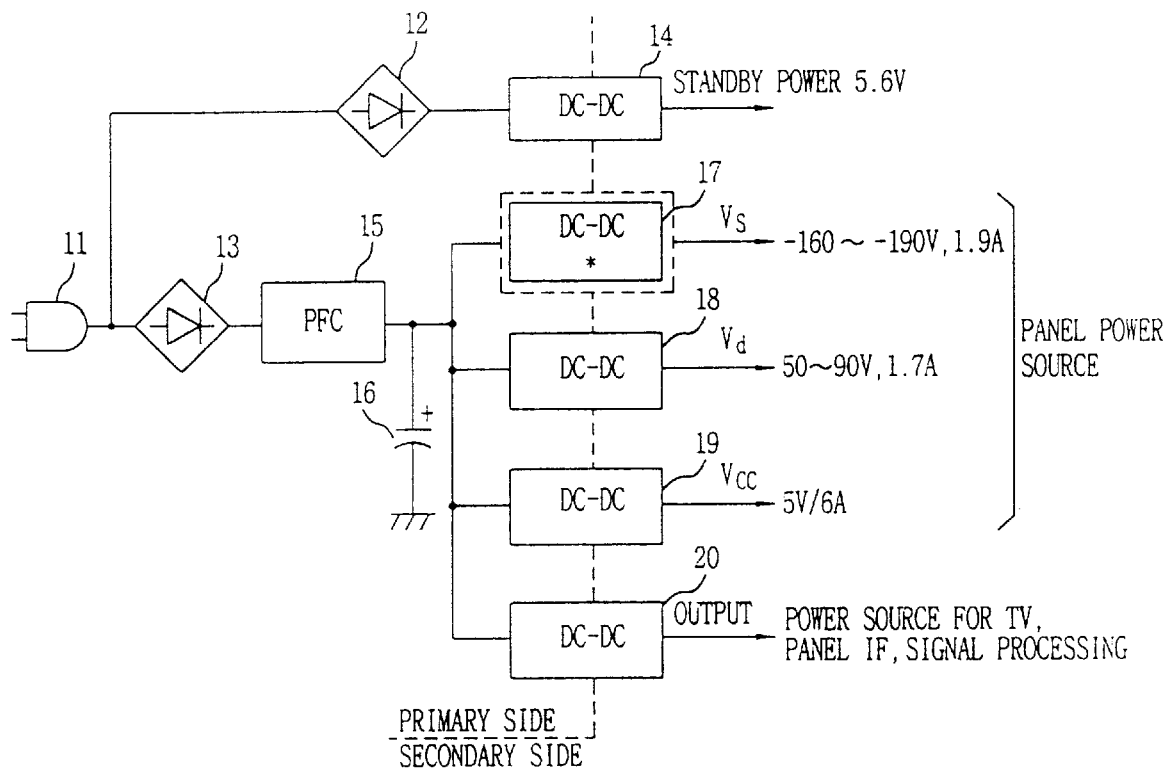
FIG. 1 is a view showing the construction of a source circuit for a conventional PDP TV.
Figure 5:
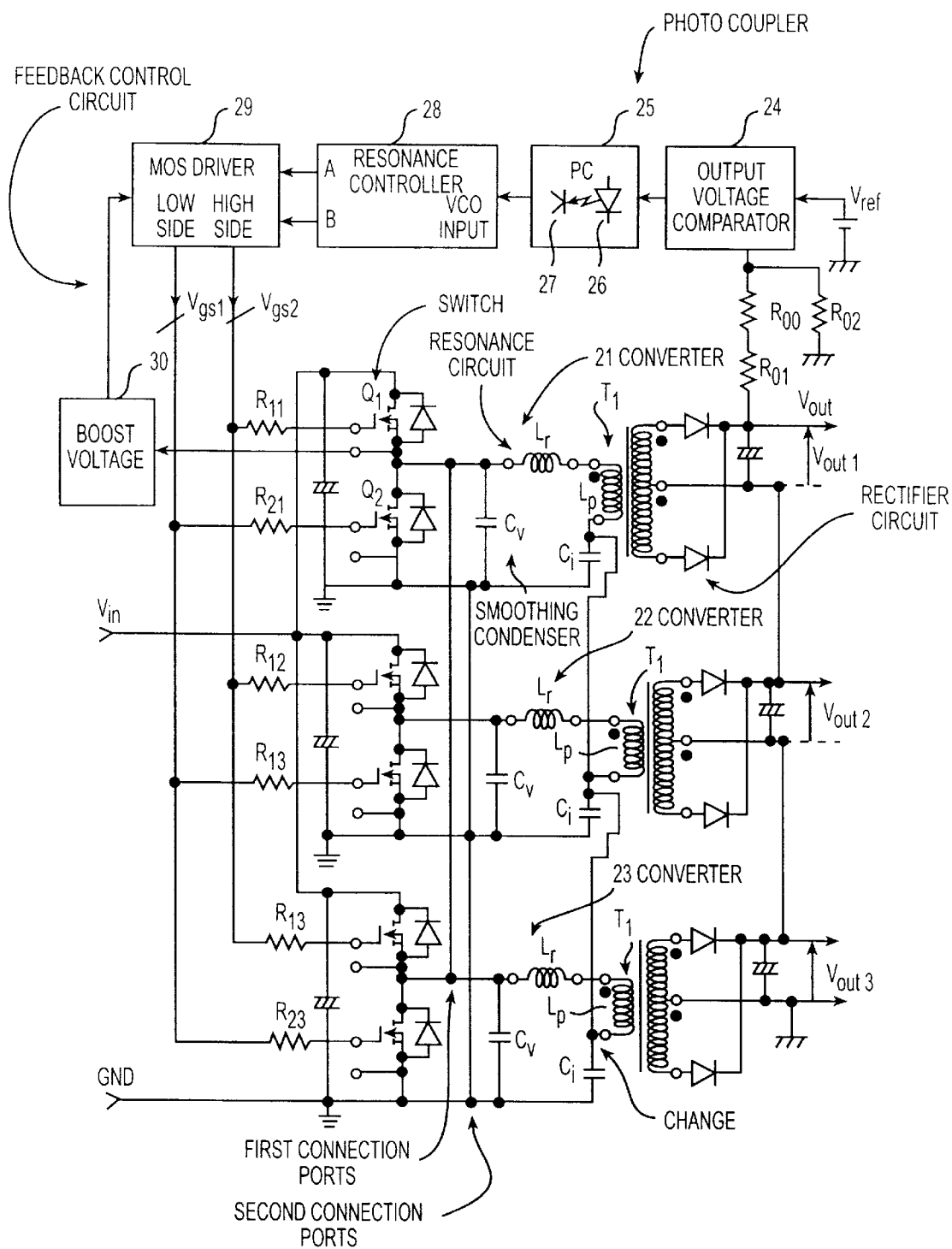
FIG. 5 is a view showing the construction of a circuit for a power supply in accordance with the present invention

FIG. 5 shows the construction of a circuit for a power supply. For example, such a power supply can embody a $V_s$ power source 17 of a power unit of FIG. 1.

Figure 2:
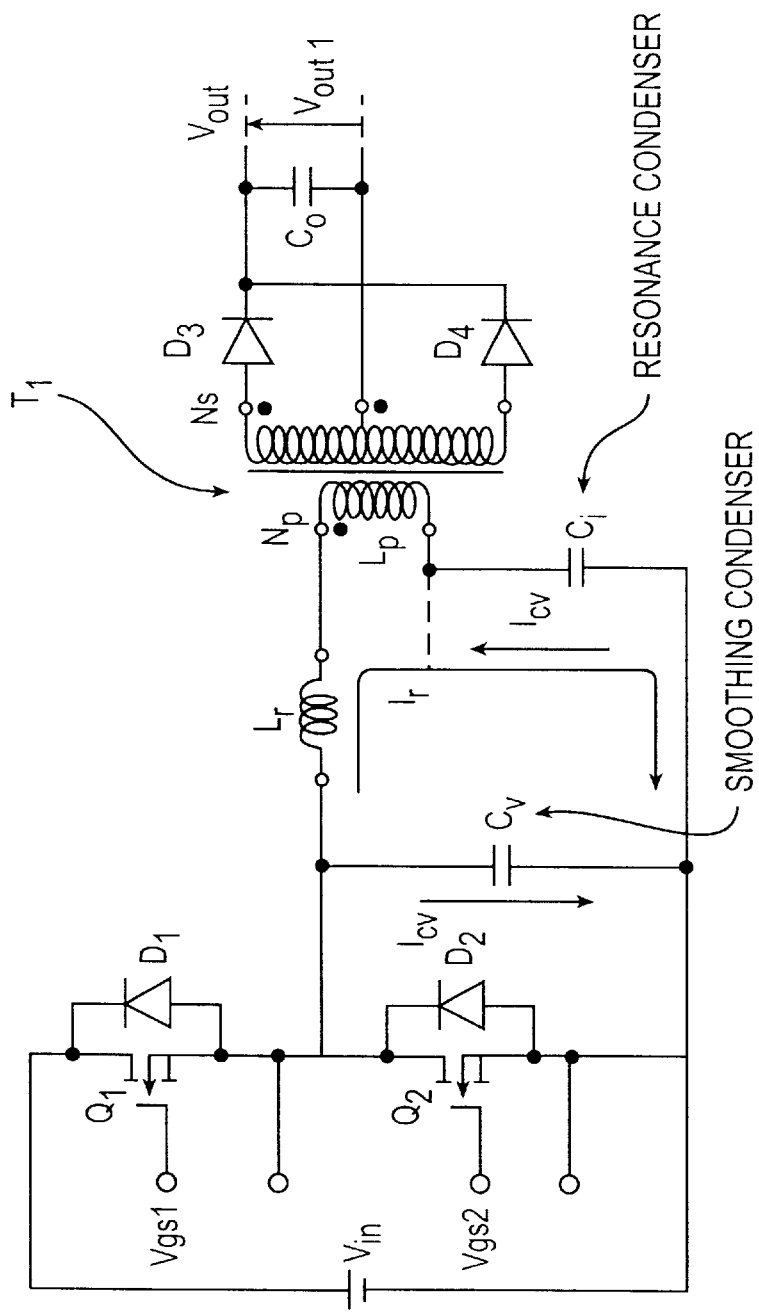
FIG. 2 is a view showing the construction of a source circuit of a conventional DC/DC converter of FIG. 2.

The power supply includes three converters 21, 22 and 23 and a common feedback control circuit. In this embodiment, a current resonance converter as illustrated in FIG. 2 can be used as the converters 21 through 23 and other types of converters such as a converter constructed of a transformer, a circuit for rectifying the output of the transformer and a smoothing condenser are also used For example, a current resonance converter, a forward converter, a RCC converter, and a flyback converter are included. In addition, the number of converters is not limited to 3, but a certain number of converters more than two can be installed.

The input of each of the converters 21 through 23 is connected in parallel, and receives a DC input voltage Vin. The output of each of the converters 21 through 23 is cascade-connected. In addition, with respect to the first side of the transformer in each of the transistors 21 through 23, the resonance circuit (inductance components $L_r$ and $L_p$ and condenser $C_i$) is connected in parallel and the smoothing condenser $C_i$ is connected in parallel.

The feedback control circuit of the power supply has the following construction.

An output voltage $V_{out}$ of the power supply is divided and detected by two resistors $R_{01}$ and $R_{02}$ and an adjusting resistor $R_{00}$ and inputted to an output voltage comparator 24. Then, the output voltage comparator 24 obtains the difference between the reference voltage $V_{ref}$ and the output voltage $V_{out}$, and thereafter its difference signal is inputted to a resonance controller 28 through a photo coupler 25. The photo coupler 25 includes a light emission diode 26 for converting an electric signal into a light signal and a photo transistor 27 for converting a light signal into an electric signal, and electrically insulates the gap between a high voltage unit and a low voltage unit of the converter (the gap between the first side and the second side of the transformer $T_1$).

Figure 3:
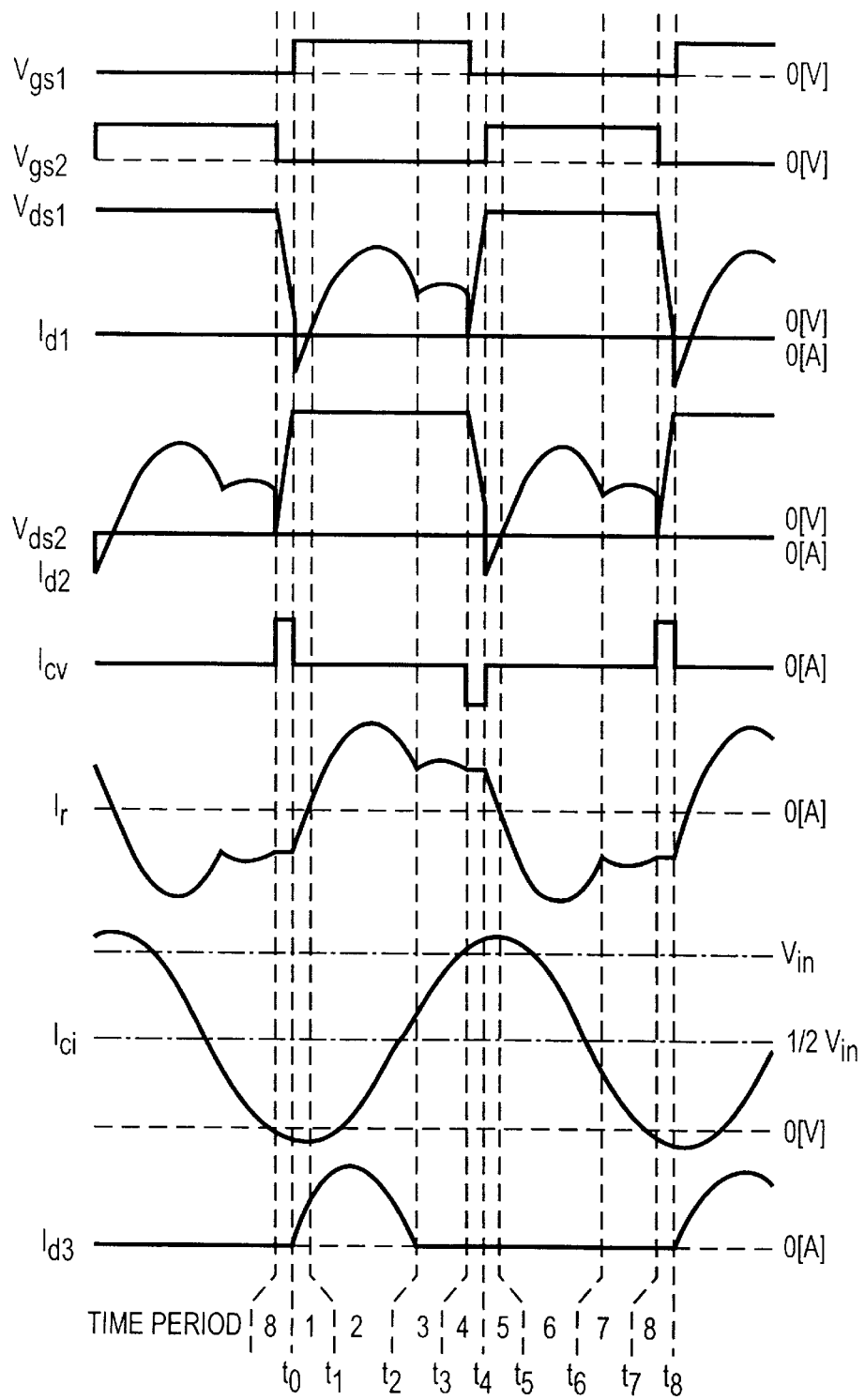
FIG. 3 is a view showing the waveforms of an operation of a DC/DC converter of FIG. 2.

Since the resonance controller 28 includes a VCO (Voltage Controlled oscillator), a frequency output corresponding to the output voltage $V_{out}$ of the power supply is obtained. That is, in the case that the output voltage $V_{out}$ is high, a high frequency is outputted, or in the case that the output voltage $V_{out}$ is low, a low frequency is outputted. The output signal of the resonance controller 28 is inputted to a MOS driver 29. The MOS driver 29 outputs the signals $V_{gs1}$ and $V_{gs2}$ as illustrated in FIG. 3 according to a frequency inputted from the controller 28, with respect to the gates of the transistor $Q_1$ at a high side and the transistor $Q_1$ at a low side. In addition, in order to form the signal $V_{gs1}$ of the high side, a potential between the transistors $Q_1$ and $Q_2$ is inputted through a boosting circuit 30.

Figure 4:
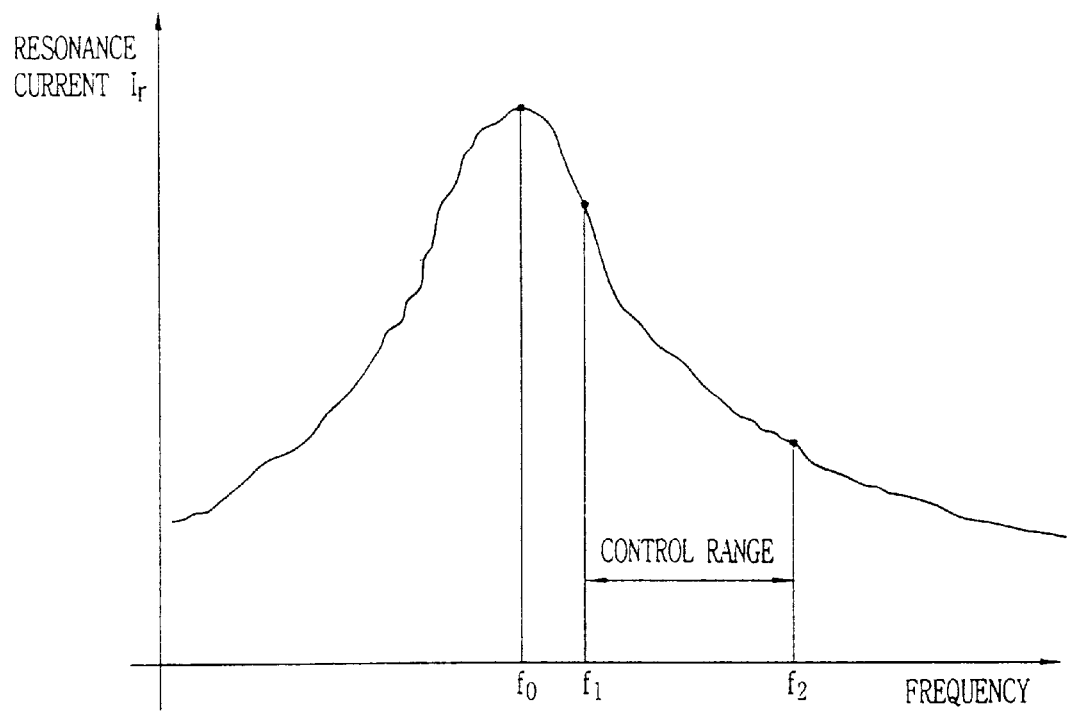
FIG. 4 is a view showing the frequency characteristics of a resonance circuit in a converter of FIG. 2.

In the above described feedback control circuit, when the output voltage $V_{out}$ of the power supply is decreased, the transistors $Q_1$ and $Q_2$ are turned on/off at a lower frequency ($f_1$ of FIG. 4). In addition, when the output voltage $V_{out}$ is increased, the transistors $Q_1$ and $Q_2$ are turned on/off at a higher frequency ($f_2$ of FIG. 4). Therefore, resonance current is controlled and the output voltages $V_{out1}$, $V_{out2}$ and $V_{out3}$ of the converters 21 through 23 are maintained constant, thereby maintaining the output voltage $V_{out}$ of the power supply, that is, the sum of the output voltages $V_{out1}$, $V_{out2}$ and $V_{out3}$, constant.

In this embodiment, the construction of the circuit for the power supply is simplified and the cost is reduced by commonly using the feedback control circuit with respect to the plurality of converter 21 through 23.

In addition, since the output of each of the converters 21 through 23, (that is, the output of the transformer $T_1$ is cascade-connected), the output voltage $V_{out}$ of the power supply is obtained as the sum of output voltages ($V_{out1}$, $V_{out2}$ and $V_{out3}$) of the converters 21 through 23. Thus, each of the converters 21 through 23 has a load share according to its output voltage. For example, if each transformer $T_1$ is under the same condition, the output voltage of each of the converters 21 through 23 is one third and its load share is also one third. In addition, there may be some errors in load sharing according to a deviation occurred in fabrication of the transformer $T_1$.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

In accordance with the present invention, in a power supply having a plurality of converters, a load share of each converter is easily set and a control circuit for a power train unit is commonly used, thereby making the construction of the circuit simplified and reducing the cost.

What is claimed is:

1. A direct current source circuit, comprising:
   a plurality of converters each having a transformer, switches for interrupting a DC input and supplying the same to a first side of the transformer and a rectifier circuit for rectifying an AC voltage outputted from a second side of the transformer;
   an output circuit which cascade-connects each output voltage of the plurality of converters and thereby obtains a composite output voltage; and
   a common feedback control circuit for controlling the plurality of switches as a function of the composite output voltage.

2. The circuit according to claim 1, wherein the plurality of converters comprise at least one or more than one of a current resonance converter, a forward converter, a RCC converter and a flyback converter.

3. The circuit according to claim 1, wherein the control circuit makes transistors turn on/off at a lower frequency when the output voltage of the power supply is decreased, and said circuit makes the transistors turn on/off at a higher frequency when the output voltage of the power supply is increased.

4. The circuit according to claim 1, wherein the output voltage of the power supply is divided and detected by a plurality of resistors to thereby be inputted to an output voltage comparater.

5. The circuit of claim 1, wherein the first side of each transformer has a first connection point and a second connection point, and wherein the first connection points are connected in parallel and the second connection points are connected in parallel.

6. The circuit of claim 5, wherein an inductor is connected between each first connection point and a first end of a first winding in each transformer.

7. The circuit of claim 5, wherein a condenser is connected between each second connection point and a second end of a first winding in each transformer.

8. The circuit of claim 7, wherein the second end of each transformer is connected together in parallel.

9. The circuit of claim 5, wherein a second side of each transformer is also connected together in parallel.

10. The circuit of claim 5, wherein for each transformer, the first connection point is connected to the second connection point by a smoothing condenser.

11. The direct current source circuit of claim 1 wherein the common control circuit further switches the plurality of switches at a frequency corresponding to a difference between the composite output voltage and a reference voltage.

* * * * *